Jan. 5, 1965    R. LEWYCKYJ    3,164,226
SELF-ADJUSTING SPRING SET BRAKE
Filed March 8, 1963    2 Sheets-Sheet 1

INVENTOR.
ROMAN LEWYCKYJ
BY
OSTROLENK, FABER, GERB & SOFFEN
ATTORNEYS

Jan. 5, 1965  R. LEWYCKYJ  3,164,226
SELF-ADJUSTING SPRING SET BRAKE
Filed March 8, 1963  2 Sheets-Sheet 2

INVENTOR.
ROMAN LEWYCKYJ
BY
OSTROLENK, FABER, GERB & SOFFEN
ATTORNEYS

United States Patent Office 3,164,226
Patented Jan. 5, 1965

3,164,226
SELF-ADJUSTING SPRING SET BRAKE
Roman Lewyckyj, Philadelphia, Pa., assignor to I-T-E Circuit Breaker Company, Philadelphia, Pa., a corporation of Pennsylvania
Filed Mar. 8, 1963, Ser. No. 263,907
5 Claims. (Cl. 188—171)

This invention relates to a spring set type brake and more specifically relates to a novel self-adjusting spring set brake wherein the stop limits for the motion of the operating arm and solenoid magnet body are automatically readjusted when the air gap between the brake lining and the brake drum varies from some predetermined value.

Accordingly, a primary object of this invention is to provide a novel self-adjusting spring set brake.

Another object of this invention is to provide a novel self-adjusting structure which can be utilized in combination with commercially available spring set brakes.

A further object of this invention is to provide a novel stop position adjustment means for automatically and continuously adjusting the air gap between the brake lining of a brake shoe and a brake drum.

A still further object of this invention is to provide a novel self-adjusting brake wherein the length of a slot which carries a cam means determines the maximum air gap between the brake lining and drum.

These and other objects of this invention will become apparent from the following description when taken in connection with the drawings in which.

Figure 1:
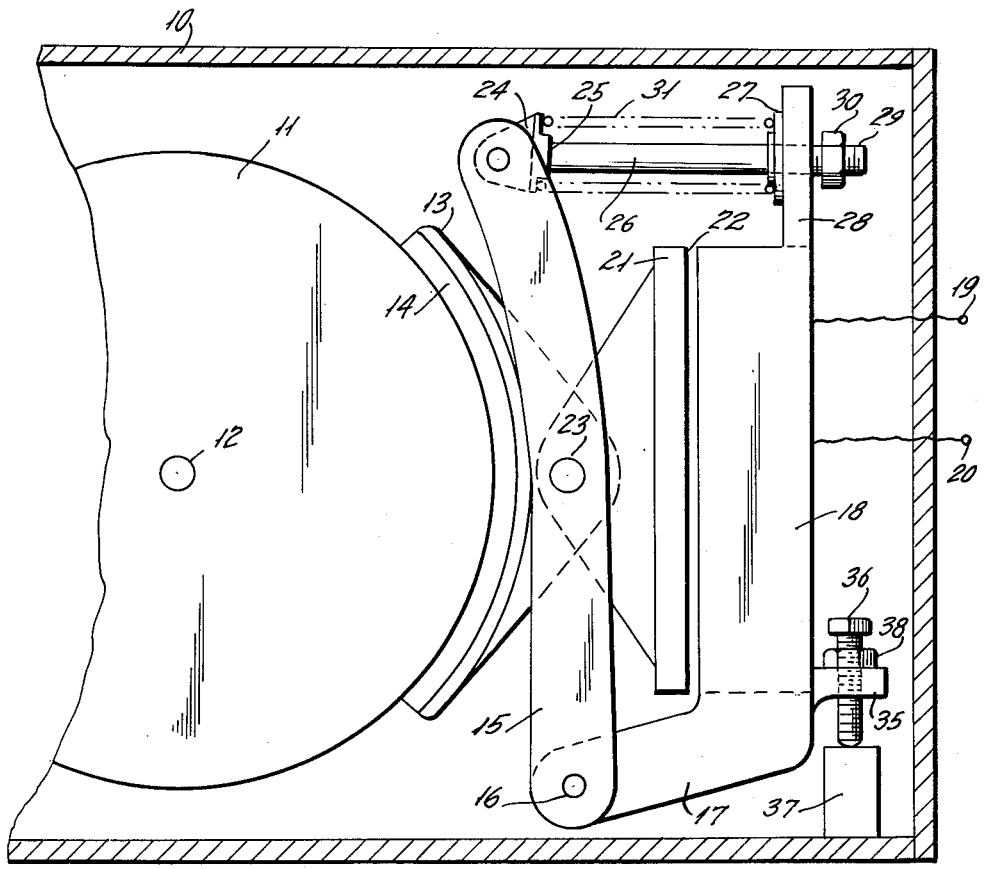
FIGURE 1 shows a plan view of a typical prior art type of spring set brake.

Referring first to FIGURE 1, the brake illustrated therein is a brake of the spring set, electrically released, shoe type. Brakes of this type are typically employed in crane hoists, steel mills, and have utility in many marine applications.

The brake lining of any type of brake is subject to wear. In electrically released brakes the wear of the brake lining will increase the air gap between the armature and its magnet so that the brake must periodically be adjusted. In the event that such periodic adjustment is not made, the air gap between the armature and magnet may become too large for the ampere turns available in the magnet to operate the brake.

Referring to FIGURE 1, I have illustrated therein a typical prior art brake which is contained within housing 10, and is used to control the rotation of a brake drum 11 which rotates on a shaft 12. The brake is generally comprised of the brake shoe 13, having a lining 14, the brake shoe 13 being carried on an operating arm 15. The operating arm 15 is pivotally mounted on a fixed pin 16 which is carried in an extension 17 of a solenoid containing structure 18. The solenoid containing structure 18 is provided with terminals 19 and 20 which are connected to a source of D.-C. power in the usual manner. The solenoid winding within housing 18 cooperates with an armature 21 through an air gap 22.

Armature 21, brake shoe 13 and operating arm 15 are all connected by a common pin 23 as illustrated. The upper end of operating arm 15 then receives a tongue 24 secured to spring cap 25 which is carried at the end of rod 26. A second spring cap 27 is carried immediately adjacent one side of extension 28 of solenoid body 18 with rod 26 extending through an opening in extension 28 and terminating in a threaded end 29 which receives a bolt 30. A spring 31 is then captured between caps 25 and 27 and exerts a force on operating arm 15 to normally bias arm 15 counterclockwise about its pivot 16 and thus biases brake shoe lining 14 into engagement with drum 11.

It will be observed that after some period of operation brake lining 14 will wear so that the arm 15 will come to rest at a farther and farther counterclockwise position. Thus the air gap 22 becomes larger after some period of operation. In order to decrease or adjust this air gap the solenoid body 18 is provided with a tongue 35 which carries an adjusting screw 36 which seats upon a seating block 37 and is locked into position by lock nut 38. This arrangement, along with fixed pivot pin 16, which can be securely seated in the opposing housing walls of housing 10, serves to fix the position of solenoid body 18.

Assuming now that air gap 22 has increased beyond some predetermined desired value, it is necessary to loosen nut 38 so that screw 36 can be threaded downwardly in tongue 35 to cause the body 18 to move counterclockwise and thus close air gap 22. The structure is then locked in this position by locking the lock nut 38.

In operation, the brake is normally set or engaged by spring 31. When it is now desired to release the brake it is only necessary to energize terminals 19 and 20 to energize the solenoid within solenoid housing 18 to thereby move armature 21 to the right, closing gap 22 moving the brake shoe 13 to the right and out of engagement with drum 11. Note that if too much wear occurs in brake lining 14, the gap 22 can increase to such a value that it would be impossible for solenoid 18 to exert sufficient force on armature 21 to move the armature to a disengaged position. For this reason, it is necessary to periodically adjust the adjusting screw 36 to maintain some given small air gap.

Figure 2:
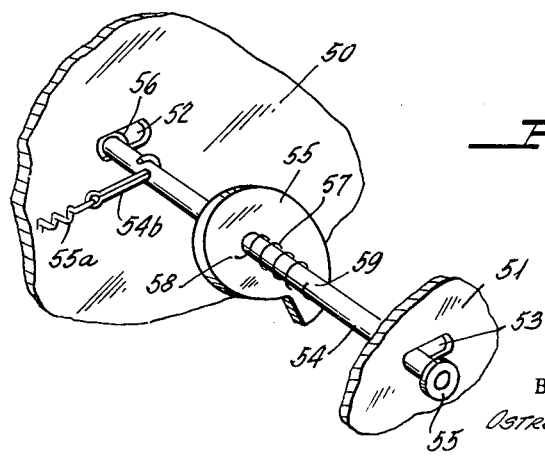
FIGURE 2 is an exploded perspective view of one of the adjustment cams of FIGURE 2 and particularly illustrates the spring connection between the cam and its mounting pin.

The principle of the present invention is to provide a novel brake arrangement which is automatically self-adjusting. The inventive concept is illustrated in FIGURE 2 wherein automatically adjusted stop positions are provided for the operating arm 15 and solenoid body 18. I will be noted that those components similar to those of FIGURE 1 have been given similar identifying numerals in FIGURES 2 and 3.

Figure 3:
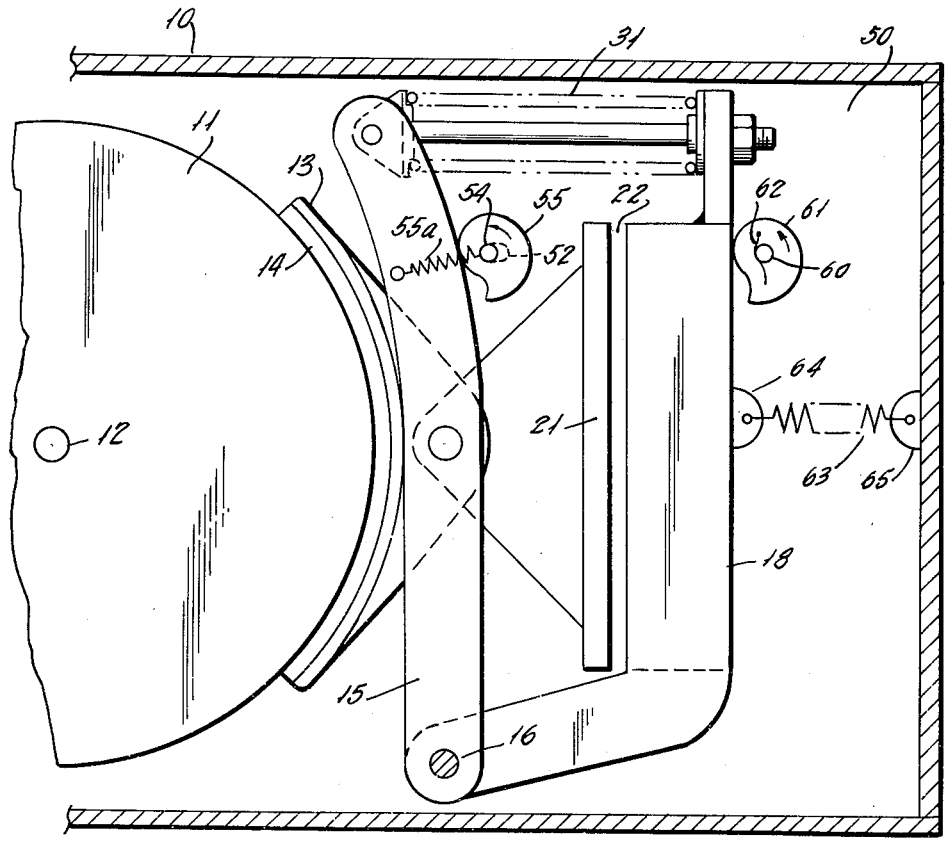
FIGURE 3 shows a side plan view of the brake of FIGURE 1 when modified according to the present invention.

Referring now to FIGURES 2 and 3, the side walls 50 and 51 (FIGURE 3) are provided with slots 52 and 53 respectively which receive a shaft 54 therein. The shaft 54 may have enlarged end portions 55 and 56 respectively to capture the shaft in the housing. As will be seen more fully hereinafter, the length of slots 52 and 53 will determine the spacing of air gap 22. The shaft 54 then receives thereon a cam 55 which is rotatable with respect to shaft 54 and is secured thereto by means of a torsion spring 57 which has one end 58 secured to cam 55 and the other end 59 secured to shaft 54.

A spring 55a is connected between arm 15 and pin 54 by means of a pin 54b (FIGURE 2) which works through an opening in shaft 54 to prevent the rotation thereof. If desired, rotation of shaft 54 could be prevented by having the ends thereof flattened and fitted with slots 52 and 53. The spring 55a then biases cam 55 into engagement with arm 15 as illustrated. Torsion spring 57 is so loaded that it will bias cam 55 to rotate in a counterclockwise direction about shaft 54 as illustrated by the arrow in FIGURE 3.

The stop mechanism including adjusting screw 36 and stop 37 is then replaced in FIGURE 2 in accordance with the invention by a shaft 60 which is secured in the enclosing side walls of housing 10 and which carries a cam 61 in a manner similar to that shown in FIGURE 3 for cam 55 and shaft 54. That is to say, the shaft 60 and 61 are independently rotatable with respect to one
[ot]her and are secured to one another by means of a
[tors]ion spring 62 schematically illustrated in FIGURE 2.
[The] only difference between the arrangement of cams 55
[and] 61 is that the shaft 60 mounting cam 61 is not secured
[to] slotted structure in the side walls. A tension spring
[i]s then secured between tongue 64 connected to mag-
[net] 18 and tongue 65 connected to housing 11.

[In] operation and when the magnet 18 is de-energized,
[spri]ng 31 forces arm 15 counterclockwise about pivot 16
[br]ing brake lining 14 into engagement with drum 11.
[At t]he same time, pin 54 is moved to the left hand side
[of s]lots 52 and 53 and cam 55 is in contact with operating
[arm] 15. If, during the operation of the brake, some
[wea]r occurs in the lining, the brake shoe 13, operating
[arm] 15 and armature 21 will have moved to a further
[coun]terclockwise rest position, about pivot 16. There-
[fore], cam 55 will lose contact with arm 15 after pin 54
[reac]hes the end of slots 52 and 53. Since cam 55 is
[bias]ed by torsion spring 57, cam 55 will rotate until it
[agai]n establishes contact with operating arm 15. As-
[sum]e now that the solenoid magnet 18 is energized in
[orde]r to release the brake so that armature 21 and brake
[shoe] 13 and operating arm 15 rotate clockwise about
[pivot] 16. Under this condition the cam 55 and its shaft
[60] move to the right until pin 54 strikes the right hand
[end] of slots 52 and 53. Thus the operating arm motion
[is st]opped but the armature 21 does not yet rest against
[the] face of solenoid magnet 18. Note that the gap which
[now] exists between the armature 21 and magnet 18 is
[exac]tly equal to the wear that occurs on lining 14 dur-
[ing] the preceding application of the brake. Since the
[mag]net 18 cannot pull armature 21 any closer, the mag-
[net] body 18 will move toward the stationary armature 21.
[Spri]ng 63 is then extended and the surface of magnet 18
[leav]es cam 61. Accordingly the torsion spring 62 on
[shaf]t 60 will cause cam 61 to rotate in a counterclockwise
[dire]ction until it again meets the surface of magnet body
[18].

Thus the self-adjusting cycle is completed so that
[whe]n the magnet 18 is de-energized and the brake lining
[14] seats on drum 11, the gap 22 will be a gap having a
[dist]ance equal to the distance through which shaft 54
[mov]es in slots 52 and 53.

[W]ith the present invention it will be observed that mi-
[nute] adjustments will occur during each application and
[rele]ase of the brake when wear occurs. Therefore, a
[pred]etermined and reliable small air gap will always
[be] maintained between the armature 21 and magnet 18.
[Sinc]e there will be a reliably small constant air gap, the
[bra]ke may now be designed with relatively smaller and
[ther]efore more economical magnets than those presently
[emp]loyed in brakes of similar capacities where the mag-
[net] must generate sufficient ampere turns to overcome
[rela]tively large air gaps that may be encountered before
[the] brake is adjusted.

[A]lthough this invention has been described with re-
[spec]t to its preferred embodiments, many variations and
[mod]ifications will now be obvious to those skilled in the
[art] and it is preferred therefore that the scope of this
[inve]ntion be limited not by the specific disclosure herein
[but] only by the appended claims.

[What] is claimed:

[1]. In a spring set brake comprising a brake drum, a
[bra]ke shoe, an operating arm, a solenoid and an arma-
[ture], and a spring braking means; said operating arm
[bein]g pivotally mounted at one end thereof, said solenoid
[bein]g pivotally mounted at one end thereof; said brake
shoe and said armature being connected to said operating
arm; said brake shoe being positioned adjacent said brake
drum and being movable between engagement and disengagement with respect thereto responsive to movement of
said operating arm; said armature being mounted adjacent said solenoid and being movable from a predetermined air gap spacing when said brake shoe engages said
brake drum to engagement therewith responsive to energization of said solenoid; said spring means being operatively connected to said control arm to bias said control arm to a predetermined position; an automatic air
gap adjusting structure; said automatic air gap adjusting
structure comprising first and second stop means operatively connected to said operating arm and said solenoid
respectively; said first stop means having stop position control means connected thereto for readjusting the stop position of said first stop means when said air gap between
said armature and said solenoid exceeds some predetermined value.

2. The device of claim 1 wherein said stop position
control means includes rotatably biased cam means engaging said control arm and a movable support member
for carrying said cam; said movable support member being movable over a predetermined distance; said cam
normally engaging said control arm until said movable
support member reaches one of its limits of movement
whereby said cam rotates to reestablish contact with said
control arm.

3. The device of claim 1 wherein each of said stop
means includes first and second rotatably biased cam
means normally engaging said control arm and said solenoid respectively and a movable support member for
carrying said first cam means; said first cam means normally engaging said control arm until said movable support member reaches one of its limits of movement whereby said first cam means rotates to reestablish contact
with said control arm.

4. An automatic control means for maintaining a predetermined maximum spacing between a solenoid and an
armature; said solenoid and said armature being relatively movable away from and toward one another; said
automatic control means including an adjustable stop
member positioned adjacent the side of said armature adjacent said solenoid; said adjustable stop member including a rotatably biased cam and a movable support means
for said cam; a fixed support for said movable support
means; said fixed support having a slot therein receiving
said movable support means; said movable support means
being movable through a predetermined limited distance
defined by the length of said slot; a biasing means connecting said cam and holding said cam in contact with
said armature until said movable support means reaches
the limit of its motion defined by said slot whereby said
cam rotates to a new position to be retained in engagement with said armature.

5. The automatic control means substantially as set
forth in claim 4 which includes a second adjustable stop
member connected to said solenoid for limiting the position thereof; said second stop member comprising a second rotatably biased cam.

References Cited in the file of this patent
UNITED STATES PATENTS

| | | |
|---|---|---|
| 2,830,682 | Noon | Apr. 15, 1958 |
| 3,032,146 | Szabo et al. | May 1, 1962 |
| 3,051,275 | Knocke | Aug. 28, 1962 |